United States Patent [19]
Bringley et al.

[11] Patent Number: 5,523,558
[45] Date of Patent: Jun. 4, 1996

[54] RADIOGRAPHIC PHOSPHOR PANEL HAVING METAL HYDRIDE STABILIZING COMPOUND

[75] Inventors: Joseph F. Bringley; Barbara J. Fisher, both of Rochester; Philip S. Bryan, Webster, all of N.Y.

[73] Assignee: Eastman Kodak Company, Rochester, N.Y.

[21] Appl. No.: 427,302

[22] Filed: Apr. 24, 1995

[51] Int. Cl.$^6$ .............................. G01T 1/16; C09K 11/61
[52] U.S. Cl. .................... 250/484.4; 252/301.4 H
[58] Field of Search ............... 250/483.1, 484.4, 250/484.3, 581; 252/301.4 H; 428/691

[56] References Cited

U.S. PATENT DOCUMENTS

| | | | |
|---|---|---|---|
| 2,502,529 | 4/1950 | Murray | 95/8 |
| 2,887,379 | 5/1959 | Blake et al. | 96/82 |
| 3,023,313 | 2/1962 | DeLaMater et al. | 250/80 |
| 3,300,310 | 1/1967 | Kennard et al. | 96/82 |
| 3,300,311 | 1/1967 | Kennard et al. | 96/82 |
| 3,617,285 | 11/1971 | Staudenmayer | 96/82 |
| 3,743,833 | 7/1973 | Martic et al. | 250/483 |
| 3,836,784 | 9/1974 | Bates et al. | 250/483 |
| 4,360,571 | 11/1982 | Rabatin | 428/691 |
| 4,374,905 | 2/1983 | Rabatin | 428/691 |
| 4,380,702 | 4/1983 | Takahashi et al. | 250/327.2 |
| 4,491,736 | 1/1985 | Teraoka | 250/484.1 |
| 4,505,989 | 3/1985 | Umemoto et al. | 428/691 |
| 4,605,861 | 8/1986 | Nakamura et al. | 250/484.1 |
| 4,912,333 | 3/1990 | Roberts et al. | 250/487.1 |
| 5,401,971 | 3/1995 | Roberts | 250/484.4 |
| 5,427,868 | 6/1995 | Bringley et al. | 428/691 |
| 5,464,568 | 11/1995 | Bringley et al. | 252/301.4 H |

FOREIGN PATENT DOCUMENTS

| | | |
|---|---|---|
| 0234385B1 | 9/1987 | European Pat. Off. |
| 2017140 | 10/1979 | United Kingdom |

OTHER PUBLICATIONS

Research Disclosure, vol. 184, Aug. 1979, Item 18431, Section I.
Research Disclosure, vol. 176, Dec. 1978, Item 17643, Section XVII.
Research Disclosure, Col. 154, Feb. 1977, Item 15444.
A. Pelter and K. Smith, "Comprehensive Organic Chemistry", Part 14–2, vol. 3, Pergamon Press, 1979.
C. F. Lane, Aldrichimica Act, 6, 51 (1973).

*Primary Examiner*—Davis L. Willis
*Assistant Examiner*—Richard Hanig
*Attorney, Agent, or Firm*—Anne B. Kiernan

[57] ABSTRACT

A radiographic phosphor panel having metal hydride stabilizer compound. The phosphor panel has a support and a luminescent layer overlaying the support. The luminescent layer includes phosphor crystals, and binder. The oxosulfur reducing agent can be added to the luminescent layer. The oxosulfur reducing agent has a concentration sufficient to substantially increase the photostimulated luminescence of the panel.

20 Claims, No Drawings

RADIOGRAPHIC PHOSPHOR PANEL HAVING METAL HYDRIDE STABILIZING COMPOUND

FIELD OF THE INVENTION

The invention relates to radiographic phosphor panels. The invention more particularly relates to radiographic phosphor panels containing metal hydride stabilizing compound.

BACKGROUND OF THE INVENTION

A radiographic phosphor panel contains a layer of phosphor, a crystalline material which responds to X-radiation on an image-wise basis. Like many other crystalline materials, radiographic phosphors have a crystal matrix which allows for the replacement of some atoms by other similar atoms, but does not readily accept other atoms or moieties. Radiographic phosphor panels can be classified, based upon their phosphors, as prompt emission panels and image storage panels.

Intensifying screens are the most common prompt emission panels. Intensifying panels are used to generate visible light upon exposure of the intensifying panel to X-radiation. A sheet of photographic film is positioned to intercept the visible light generated and commonly is pressed against the intensifying panel within a light-tight cassette. Other prompt emission panels operate similarly, but in place of the photographic film have some other means for visualizing the X-radiation.

Storage panels have storage phosphors, that have the capability of storing latent X-ray images for later release, apparently by locally trapping electron-hole pairs created by incident X-rays. Storage phosphors are distinguishable from the phosphors used in X-ray intensifying or conversion screens. In the latter, a latent image is not stored and X-radiation causes the immediate release of visible light from irradiated phosphor crystals.

Radiation image storage panels are used in computed radiography. The panel is first exposed to X-radiation to create a latent image. The panel is then stimulated with longer wavelength radiation, resulting in the emission of radiation at a third wavelength. Typically a laser having a red or infrared beam is scanned over the panel, resulting in the emission of green or blue radiation. The emitted light is collected and the resulting signal is processed electronically to produce a final image.

Degradation of final images due to panel discoloration has long been recognized for intensifying screens. There has not, however, been agreement as to the source of that discoloration. What has been noticed is that screens subject to prolonged exposure to photographic film have tended to become discolored. U.S. Pat. Nos. 4,374,905 and 4,360,571 state that the discoloration is due to "volatile organic constituents escaping from the associated photographic film" (U.S. Pat. No. 4,374,905, column 1, lines 40–59 and U.S. Pat. No. 4,360,571, column 1, lines 46–64). Great Britain Patent Application No. GB 2 017 140 A states:

"[I]t has been discovered that screens containing lanthanum-oxy-halide phosphors tend to discolor rapidly when in use and in particular when held in contact with an X-ray film, . . .

"Gadolinium-oxy-halides are similar . . .

"In spite of intensive research into this discolouration defect the cause of it is not yet clearly known but it appears to be a complex reaction caused, in part at least, by the hydroscopic nature of the lanthanum-oxy-halide phosphors or gadolinium-oxy-halide phosphors, the nature of the binder and the presence of the X-ray film held in contact with the screen for a period of time.

"Furthermore, under somewhat different conditions of use X-ray screens and in particular X-ray screens which contain lanthanum-oxyhalide or gadolinium-oxyhalide phosphors can lose speed due to a different defect which appears to involve only the phosphor. This is hydrolysis of the phosphor which is caused by water present in the phosphor layer due either to atmospheric moisture or aqueous cleaning fluid penetrating the protective layer of the screen. It is thought that quantities of halide or more surprisingly, the free halogen, released by hydrolysis may actually catalyse the discolouration of the binder or of compounds having migrated from the film." (page 1, lines 14–33)

U.S. Pat. No. 4,374,905, to Rabatin, teaches a solution to both discoloration by "volatile organic constituents" and attack by water. The phosphor for an intensifying screen was milled with anhydrous $MgSO_4$ or $ZnSO_4$ (0.5 to 4 weight percent) during preparation of the screen. It was proposed that the protective action was based upon the reaction:

$$MgSO_4 + 2HOH \rightarrow Mg(OH)_2 + 2H^+ + SO_4^{2-}$$

U.S. Pat. No. 3,836,784, to Bates et al, teaches that small amounts of "stabilizers", such as sodium thiosulfate or potassium thiosulfate can be included in the fluorocarbon binder of an intensifying screen. Bates et al, which used an iodide containing phosphor, noted:

"[A]ctivated iodide phosphors are extremely hygroscopic. Absorption of small amounts of water rapidly reduces the conversion efficiency to a vanishingly small value. In order to employ activated iodide phosphors it is therefore necessary to provide the activated iodide phosphor in the screen in a form in which it remains stable for long periods of time.

"Various ways have been taught for using thallium activated potassium iodide and protecting the iodide from moisture." (Bates et al, column 1, lines 20–30)

U.S. Pat. No. 3,023,313 to De La Mater et al teaches the use of small amounts of sodium thiosulfate or potassium thiosulfate in the binder of an intensifying screen. Examples list 2 grams and 6 grams of sodium thiosulfate per 200 grams of potassium iodide phosphor.

In U.S. Pat. No. 4,360,571, to Rabatin, phosphors were treated with fatty acids or metal salts of fatty acids to prevent discoloration by "volatile organic constituents" and attack by water. In GB 2 017 140 A, intensifying screens were stabilized against discolouration and hydrolysis by incorporation of a compound containing a free epoxy group and, optionally, a dialkyl tin compound such as dibutyl tin diocytl as an additional stabilizer.

Radiation image storage panels, unlike intensifying screens, are subject to degradative losses of both emitted light and stimulating radiation. Since these effects are cumulative, discoloration can be an even more serious issue in storage panels than in intensifying screens.

Yellowing of a phosphor layer of a radiation image storage phosphor panel, in which the phosphor contains iodine, is described in European Patent Specification No. EP 0 234 385 B1. The yellowing is ascribed to liberation of free iodine. The solution taught for the yellowing problem, is incorporation in the phosphor layer of a compound containing a free epoxy group and/or a compound selected from: phosphites, organotin compounds, and metal salts of organic acids, specifically: octylic acid, lauric acid, stearic acid, oleic acid, ricinoleic acid, naphthenic acid, 2-ethylhexanoic acid, resin acid, synthetic carboxylic acid, benzoic acid, salicylic acid, organic phosphinous acid, phenol, and alkylphenol.

It would be desirable to provide improved radiation image storage panels with stability against yellowing and/or hydrolysis.

SUMMARY OF THE INVENTION

The invention, in its broader aspects, provides a radiographic phosphor panel containing metal hydride compound. The metal hydride compound acts as a stabilizing compound. The phosphor panel has a support and a luminescent layer overlaying the support. The luminescent layer includes phosphor crystals capable of absorbing X-radiation. The metal hydride stabilizing compound is present in a concentration sufficient to substantially increase the photostimulated luminescence of the radiation phosphor panel.

It is an advantageous effect of at least some of the embodiments of the invention that radiograhic phosphor panels are provided which exhibit improved performance and enhanced stabilization against yellowing and/or hydrolysis of the panel.

DESCRIPTION OF PARTICULAR EMBODIMENTS

The radiographic phospor panel of the invention comprises a metal hydride stabilizing compound. The panel consists of a support, a luminescent layer and an optional overcoat layer. The luminescent layer includes phosphor crystals and a binder. The metal hydride stabilizing compound is preferably located in the luminescent layer. The luminescent layer can consist of one or more layers, for example one layer can contain the phosphor crystals and a separate and adjacent layer can contain the metal hydride stabilizing compound.

The phosphor crystals in the luminescent layer can be any phosphor crystals that are capable of absorbing X-radiation and emitting electromagnetic radiation of a second wavelength. The phosphor crystals can be those that emit the second wavelength promptly after the absortion of the X-radiation and are used to construct prompt emission panels, or the phosphor crystals can be those that are able to store the absorbed energy and release it after exposure to electromagnetic radiation and are used to construct storage phosphors.

The following description is primarily directed to radiographic image storage panels; however, the invention is not limited to storage panels. The term "radiographic phosphor panel" refers to both a radiation image storage panel and a prompt emission panel.

The phosphor in the radiographic phosphor panel can be chosen from radiographic phosphors generally. Halide containing phosphors are preferred, and more preferred are iodine containing phosphors, because the metal hydride stabilizing compounds stabilize against discoloration associated with halide containing phosophors, particularly with iodine containing phosphors. The following description is primarily directed to iodine containing phosphors; however, the invention is not limited to them.

Examples of phosphors which include iodine are divalent alkaline earth metal fluorohalide storage phosphors containing iodine and alkali metal halide storage phosphors containing iodine. A mixture of phosphors, at least one of which contains iodine, could also be used, if desired, to form a panel having optimal properties for a particular application.

Panel constructions containing more than one phosphor containing layer are also possible, with iodine containing phosphors being present in one or more of the phosphor-containing layers.

The term "metal hydride stabilizing compound" or "metal hydride reducing agent for iodine" is used to designate chemical species capable of reducing free (molecular) iodine according to the half-reaction:

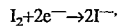

$$I_2 + 2e^- \rightarrow 2I^-,$$

or is capable of reducing another halide according to the half-reaction:

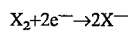

$$X_2 + 2e^- \rightarrow 2X^-$$

The metal hydride stabilizing compound of the present invention are described by the general formula:

$$D_x[MH_aR_b]y$$

where

D is an inorganic or organic cation;

M is aluminum or boron;

R is an organic or organometallic group, such as, alkyl, aryl, carboxy, alkoxide, amine, amide, and phosphine;

x and y are chosen such that charge neutrality is obeyed, and y is greater than 0;

a is an integer from 1 to 4;

b is an integer from 0 to 4;

and a+b preferably equals 4;

Suitable examples of D groups include $Li^+$, $Na^+$, $K^+$, $Ca^{2+}$, $Al^{3+}$, bis(triphenylphosphine) copper and $(ethyl)4^{N+}$. Preferred D groups are bis(triphenylphosphine) copper, $Li^+$ and $Na^+$.

The R group may be straight, branched or cyclic and may be substituted or unsubstituted. Preferred R groups will have 1 to 50 carbons, more preferably 1 to 25 and most preferably 1 to 10 carbons. When an R group is an aryl group, it can be an aromatic or heteroaromatic ring system having a solitary ring or 2 to 3 linked or fused rings. The rings can have 5 or 6 members, and the ring system preferably has a total of from 6 to 25 carbons and/or heteroatoms selected from the group consisting of N, O, and S. The linked rings can be directly linked or they can have a linking group. Examples of linked groups include alkyl or haloalkyl groups of from 1 to 10 carbons, —O—, —S—,

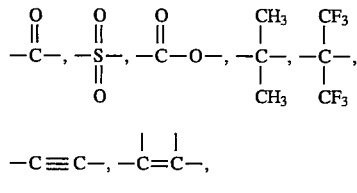

, or the like.

Suitable examples of R groups are methoxide, ethoxide, dimethylamine, trimethylamine, tertbutylamine, pyridine, morpholine, triethylamine, triphenylphosphine, and triethylphosphine. Preferred R groups are selected from morpholine, trimethylamine, and dimethylamine. Currently most preferred R groups are morpholine and trimethylamine.

Suitable examples of metal hydride stabilizing compounds are $LiAlH_4$, $NaBH_4$, borane. tertbutylamine, borane.dimethylamine, borane. 2,6-lutidine, borane.morpholine, borane.pyridine, borane. triethylamine, borane.trimethylamine, borane. triphenylphosphine, bis(triphenylphosphine) copper borohydride, and $NaBH(OCH_3)_3$. Currently preferred metal hydride stabilizing compounds are borane.morpholine, borane.trimethylamine and bis(triphenylphosphine) copper borohydride.

The most preferred metal hydride stabilizing compounds are when M is boron. The boron hydride stabilizing compounds can be boron hydrogen compounds or boron complexes. Preferred boron hydride stabilizing compounds have the following structure:

$$BH_3R_1$$

where R is defined above.

The most preferred compound of the above structure is borane-morpholine.

The R and D groups can be selected on the basis of convenience, non-toxicity, non-hygroscopicity, solubility in the solvent for a particular binder and non-interference with the desired characteristics of the panel produced. It is generally preferred that the reducing agent and the product of its reaction with iodine be colorless, however, some coloration within a suitable wavelength range could be accomodated. It is generally preferred that the metal hydride stabilizing compound be soluble in a suitable solvent such that it can be dispersed in the binder on a substantially molecular basis. The metal hydride stabilizing compound should be further chosen such that it does not impart undesirable characteristics to the radiographic panel such as odor, and poor mechanical strength.

Many examples of metal hydride stabilizing compounds can be found in the following references: 1. A. Pelter and K. Smith, *Comprehensive Organic Chemistry*, Part 14–2, Vol. 3, Pergamon Press, 1979; and 2. C. F. Lane, *Aldrichimica Act*, 6, 51 (1973).

It is generally taught in the art that the degradation of image storage panels results from both oxidation and hydrolysis of the phosphor as a result of its exposure to air, heat and moisture. This process is thought to liberate intensely colored and highly light absorbing iodine molecules from the panel, which in turn, stain the panel and dramatically degrade its speed. The preferred metal hydride stabilizing compounds, particularly, the boron hydrogen compounds and borane complexes of the present invention are effective reducing agents for molecular iodine and furthermore, rapidly react with water as described by the following reaction:

$$R \cdot BH_3 + 3I_2 + 3H_2O \rightarrow RH^+ + 6I^- + 5H^+ + B(OH)_3$$

The boranes are thus simultaneously able to serve two functions in the panel; effectively reducing iodine, thereby preventing the discolouration of the panel, and preventing the hydrolysis of the phosphor.

The concentration of the metal hydride stabilizing compound for reducing the molecular iodine preferably in the luminescent layer of the phosphor panel of the invention should be an amount sufficient to increase the photostimulated luminescence of the phosphor panel as compared to a control panel which does not contain a reducing agent and/or stabilizing compound. There is theoretically no upper limit of the concentration of stabilizing compounds in the layers of the panel, however, deterioration of panel characteristics at very high concentrations of stabilizing compound is expected, if, by no other means than displacement of phosphor or binder. Convenient concentrations of the metal hydride stabilizing compound are a fraction or few weight percent relative to the weight of the phosphor, or a range of about 0.1 to about 10.0, preferably 0.1 to 4 weight percent relative to the weight of the phosphor (also referred herein as (wt/wt)%).

One or more metal hydride stabilizing compounds can be used in combination with other reducing agents or stabilizing compounds, such as, oxosulfur reducing pigments, binder compatible oxosulfur reducing agents, epoxides, organotin compounds, phosphites, and metal salts of organic acids. The total concentration of the stabilizing compounds and reducing agents preferably should not exceed 10 (wt/wt)%.

The metal hydride stabilizing compound is preferably binder compatible. The term "binder compatible" is used herein to indicate that the metal hydride stabilizing compound is not dispersed in particulate form in the binder, but rather is dispersed on a molecular basis or on a substantially molecular basis. Binder compatible is, for example, inclusive of what is sometimes referred to as a "solid solution". Binder compatible is also inclusive of a solid solution within one phase of a two binder system. When the metal hydride stabilizing compound and binder have solubility properties in common, the stabilizing compound is usually binder compatible and the metal hydride stabilizing compound and binder can be dissolved in the same solvent and then solvent cast to form a single substantially uniform layer. In the phosphor panel, the metal hydride stabilizing compound and binder preferably provide a solvent cast matrix for the phosphor and any other particulate addenda.

If the metal hydride stabilizing compound is not binder compatible, then it must be capable of dispersion in a particulate form in the binder in such a way that it is substantially nonabsorbing of the stimulating or emitted light. Typically the metal hydride stabilizing compound is added to the binder with the phosphor to prepare the dispersion. A preferred median particle size of the stabilizing compound is from 0.01 to 4 micrometers. It is more preferred that the median particle size be from 0.1 to 1 micrometer and that the range of particle sizes be substantially from 0.01 to 4 micrometers. Particles outside the indicated range should be limited to trace amounts.

In particular embodiments of the invention, it may be desirable to add white pigment. Suitable pigments, are well known to those skilled in the art and include materials such as titania and barium sulfate. White pigments have been utilized in the art to increase resolution at the expense of speed.

In particular embodiments of the invention, the phosphor is a storage phosphor which is the product of firing starting materials comprising a combination of species characterized by the relationship:

$$MFX_{1-z}I_z \cdot uM^aX_a : yA : eQ : tD,$$

where M is selected from Mg, Ca, Sr, and Ba; X is selected from Cl and Br; $M^a$ is selected from Na, K, Rb, and Cs; $X^a$ is selected from Cl, Br, and I; A is selected from Eu, Ce, Sm, and Tb; Q is an oxide selected from BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$, $Nb_2O_5$, $Ta_2O_5$, and $ThO_2$; and D is selected from V, Cr, Mn, Fe, Co, and Ni. Numbers are represented by the following: z is from $1 \times 10^{-4}$ to 1, u is from 0 to 1, y is from $1 \times 10^{-4}$ to 0.1, e is from 0 to 1, or more preferably from $1 \times 10^{-5}$ to 0.1, and t is from 0 to $1 \times 10^{-2}$. The same designations appearing elsewhere herein have the same meanings unless specifically stated to the contrary. Groups of materials, for example the materials defined by M, are to be understood as inclusive of combinations of materials in that group.

In some of those embodiments of the invention, the panel includes a divalent alkaline earth metal fluorohalide storage phosphor containing iodine which is the product of firing an intermediate, a combination of species characterized by the relationship:

$$(Ba_{1-a-b-c}Mg_aCa_bSr_c)FX_{1-z}I_z \cdot rM^aX^a{:}yA{:}eQ$$

where X, Ma, Xa, A, Q, z, y, and e have the same meanings as in formula (1) and the sum of a, b, and c is from 0 to 0.4, and r is from $1\times10^{-6}$ to 0.1. In a particular embodiment of the invention, Ma is potassium and the storage phosphor is further characterized as disclosed in a U.S. patent application Ser. No. 157,583, filed Nov. 24, 1993, and continuation in part U.S. patent application 300,116, filed Sep. 2, 1994, by Joseph F. Bringley, Philip S. Bryan and Andrea M. Hyde, entitled: ALKALINE EARTH METAL FLUOROBROMOIODIDE STORAGE PHOSPHOR AND RADIATION IMAGE STORAGE PANEL, the disclosure of which is hereby incorporated herein by reference.

In a particular embodiment of the invention, the phosphor is produced utilizing an oxosulfur reducing agent containing storage phosphor intermediate, disclosed in a U.S. patent application Ser. No. 157,582, filed Nov. 24, 1993, and continuation in part U.S. application Ser. No. 300,113, filed Sep. 2, 1994, by Joseph F. Bringley, Philip S. Bryan and Andrea M. Hyde, entitled: STABILIZED PHOSPHOR INTERMEDIATES, STORAGE PHOSPHORS, RADIATION IMAGE STORAGE PANELS, AND PREPARATION METHODS; (hereafter referred to as "Stabilized Phosphor Intermediates Application), the disclosure of which is hereby incorporated herein by reference. The stabilized phosphor intermediate disclosed therein and its resulting phosphor have increased photostimulated luminescence in comparison to unstabilized controls. It is expected that increased photostimulated luminescent provided thereby is cumulative with the increased photostimulated luminescent provided in the claimed invention.

The oxosulfur reducing agent utilized in the Stabilized Phosphor Intermediates Application can be selected from the oxosulfur reducing agents disclosed in U.S. patent application Ser. No. 157,797, filed Nov. 24, 1993, by Joseph F. Bringley, Philip S. Bryan, and Andrea M. Hyde, entitled: PIGMENT STABILIZED RADIATION IMAGE STORAGE PANEL AND METHOD FOR PREPARING RADIATION IMAGE STORAGE PANEL, the disclosure of which has been incorporated herein by reference. Care is taken in the selection of inorganic cations so as to not cause deleterious effects on the phosphor produced. In the inventive phosphor of the Stabilized Phosphor Intermediates Application, the oxosulfur reducing agent is present in the unfired intermediate for the phosphor in an amount sufficient to increase relative photostimulated luminescence in the fired phosphor relative to the same phosphor absent said reducing agent for iodine. In particular embodiments of the Stabilized Phosphor Intermediates Application, the phosphor has the general structure $$MFX_{1-z}I_z \cdot uM^aX^a{:}yA{:}eQ{:}tD$$

or $(Ba_{1-a-b-c}Mg_aCa_bSr_c) FX_{1-z}I_z \cdot rM^aX^a{:}yA{:}eQ$
in which these formulas have the same meanings as discussed above and the oxosulfur reducing agent is present in the intermediates in a molar ratio of sulfur to alkaline earth metal of greater than $1\times10^{-4}$ and less than 0.020.

The luminescent layer of the phosphor panel of the invention contains a polymeric binder to give it structural coherence. In general the binders useful in the practice of the invention are those conventionally employed in the art. Binders are generally chosen from a wide variety of known organic polymers which are transparent to x-rays, stimulating, and emitted light. Binders commonly employed in the art include sodium o-sulfobenzaldehyde acetal of poly(vinyl alcohol); chlorosulfonated poly(ethylene); a mixture of macromolecular bisphenol poly(carbonates) and copolymers comprising bisphenol carbonates and poly(alkylene oxides); aqueous ethanol soluble nylons; poly(alkyl acrylates and methacrylates) and copolymers of poly(alkyl acrylates and methacrylates with acrylic and methacrylic acid); poly(vinyl butyral); and poly(urethane) elastomers. These and other useful binders are disclosed in U.S. Pat. Nos. 2,502,529; 2,887,379; 3,617,285; 3,300,310; 3,300,311; and 3,743,833; and in Research Disclosure, Vol. 154, Feburary 1977, Item 15444, and Vol. 182, Jun. 1979. Research Disclosure is published by Kenneth Mason Publications, Ltd., Emsworth, Hampshire P010 7DD, England. Particularly preferred binders are poly(urethanes), such as those commercially available under the trademark Estane from Goodrich Chemical Co., the trademark Permuthane from the Permuthane Division of ICI, and the trademark Cargill from Cargill, Inc.

Any conventional ratio of phosphor to binder can be employed. Generally thinner phosphor layers and sharper images are realized when a high weight ratio of phosphor to binder is employed. Preferred phosphor to binder ratios are in the range of from about 7:1 to 25:1 for panel constructions intended to withstand commercial exposure repetitions without loss of structural integrity. For limited or single exposure applications it is, of course, appreciated that any minimal amount of binder consistent with structural integrity is satisfactory.

For the highest attainable speeds a white support, such as a titania or barium sulfate loaded or coated support is employed. Particular reflective supports which offer a balance of speed and sharpness are those containing reflective microlenslets, such as are disclosed in U.S. Pat. No. 4,912,333 to Roberts, et al. In those instances in which it is desired to reduce the effective thickness of a phosphor layer below its actual thickness the phosphor layer is modified to impart a small, but significant degree of light absorption. If the binder is chosen to exhibit the desired degree of light absorption, then no other ingredient of the phosphor layer is required to perform the light attenuation function. It is specifically noted that the less structurally complex chromophores for ultraviolet absorption particularly lend themselves to incorporation in polymers. A separate absorber can be incorporated in the phosphor layer to reduce its effective thickness. The absorber can be a dye or pigment capable of absorbing light within a desired spectrum. Black dyes and pigments such as carbon black are, of course, generally useful with phosphors, because of their broad absorption spectra. With storage panels, it is preferable to include a dye or pigment which absorbs some of the stimulating radiation, generally provided by a laser; but mostly reflects emitted light. U.S. Pat. No. 4,491,736 to Teraoka teaches the use of such materials in storage panels.

Apart from the phosphor layers and the assembly features described above, the panel can be of any conventional construction. Panels typically have one or more flexible or rigid support layers. Flexible layers are most commonly polymeric. The most common polymeric supports are films of high dimensional integrity, such as poly(ethylene terephthalate) film supports. In a preferred embodiment of the invention, support is provided by one or more polymeric layers and by a rigid plate of aluminum or the like.

Metal layers, such as aluminum, enhance reflection. Paper supports, though less common than film supports, are known and can be used for specific applications. Dyes and pigments are commonly loaded into supports to enhance absorption or reflection of light. Air can be trapped in supports to reflect ultraviolet and visible light. Supports and the subbing layers used to improve coating adhesion can be chosen from among those employed for silver halide photographic and radiographic elements, as illustrated by Research Disclosure, Vol. 176, December 1978, Item 17643, Section XVII, and Research Disclosure, Vol. 184, August 1979, Item 18431, Section I.

An overcoat layer, although not required, is commonly located over the luminescent layer for humidity and wear protection. If the panel includes an overcoat layer, the metal hydride stabilizing compound and/or other reducing agents or stabilizing compounds can be located in the overcoat layer or the luminescent layer or both. The overcoat layer comprises a binder chosen using the criteria described above for the binder in the luminescent layer. It is understood that the binder used in the overcoat layer, and the binder forming the matrix in which the phosphor particles are held, are preferably formed of transparent resins that do not interfer with the passage of x-rays or stimulating radiation or the emitted light from the phosphors. The overcoat binder can be the same binder as in the luminescent layer or different and can also be chosen from polymers useful for supports. Since it is generally required that the overcoat layer exhibit toughness and scratch resistance, polymers conventionally employed for film supports are favored. For example, cellulose acetate is an overcoat commonly used with the poly(urethane) binders. Overcoat polymers are often used also to seal the edges of the phosphor layer. In a preferred embodiment of the invention, the overcoat is produced in accordance with a U.S. Pat. No. 5,401,971, issued Mar. 28, 1995 to Luther C. Roberts, entitled: OVERCOATED RADIATION IMAGE STORAGE PANEL AND METHOD FOR PREPARING RADIATION IMAGE STORAGE PANEL, the disclosure of which is hereby incorporated herein by reference.

While anticurl layers are not required for the panels, they are generally preferred for inclusion. The function of the anticurl layer is to balance the forces exerted by the layers coated on the opposite major surface of a support which, if left unchecked, cause the support to assume a non-planar configuration, that is, to curl or roll up on itself. Materials forming the anticurl layers can be chosen from among those identified above for use as binders and overcoats. Generally an anticurl layer is formed of the same polymer as the overcoat on the opposite side of the support. For example, cellulose acetate is preferred for both overcoat and anticurl layers.

Any one or combination of conventional panel features compatible with the features described herein can, of course, be employed. Conventional storage panel constructions are disclosed in U.S. Pat. No. 4,380,702 to Takahashi et al, the disclosure of which is hereby incorporated by reference. Conventional intensifying panel constructions are disclosed in Research Disclosure, Vol. 184, August 1979, Item 18431, hereby incorporated herein by reference.

The radiographic panels of the invention are formed by conventional coating techniques. Phosphor powder, metal hydride reducing agent and other addenda are mixed with a solution of a resin binder material and coated by means such as blade coating onto a substrate. U.S. Pat. No. 4,505,989 to Umemoto et al, the disclosure of which is hereby incorporated herein by reference, describes suitable techniques known in the art for preparing an X-ray image storage panel.

The following Examples and Comparative Examples are presented to further illustrate and elucidate some preferred modes of practice of the invention. Unless otherwise indicated, all starting materials were commercially obtained.

Bis(triphenylphosphine) copper borohydride, borane.morpholine, and borane.triphenylphosphine were obtained commercially from Aldrich Chemical Co, Milwaukee, Wis., USA.

The X-ray storage phosphor, $BaFBr.851.15:0.001Eu^{2+}$ was prepared by the following general procedure: Into a 2000 ml beaker containing a Teflon coated magnetic stir bar, 269.54 grams $BaBr_2.2H_2O$ and 62.22 grams of $BaI_2.2H_2O$ were dissolved in a 2 to 3 fold excess of distilled water and the solution filtered. To the filtered solution was then added 2.88 grams of fumed silica and 0.500 grams of $BaS_2O_3.H_2O$ followed by 0.088 grams KBr. 167.5 grams of $BaF_2$ containing 0.002 moles of $EuF_2$ and 0.01 moles $CaF_2$ were then added to the solution slowly with vigorous stirring. Stirring was maintained for about 1 hour and the resulting slurry was then spray-dried through an air driven rotary atomizer at an inlet temperature of 350° C. and an outlet temperature of 110° C. The resulting white powder was then placed into alumina crucibles and fired at a temperature of 840 to 860° C. for 3.5 hours under flowing nitrogen. The phosphor powders, after being allowed to cool under nitrogen, were then ground and sieved through a 38 micron screen yielding the finished phosphor.

EXAMPLES 1–3 AND THE COMPARATIVE EXAMPLE

Image storage panels were prepared by the following general procedure. Phosphor and a metal hydride stabilizing compound, 1 (wt/wt)%, were dispersed in a 13% (weight/weight) solution of PERMUTHANE™ U-6366 polyurethane marketed by ICI Polyurethanes Group of West Deptford, New Jersey in 93:7 (weight/weight) dichloromethane/methanol solvent. The dispersions were milled 30 minutes with zirconium oxide beads on a paint shaker. The phosphor to binder ratio was about 15:1. Knife-coatings were prepared on a polyethylene terephthalate support. The knife-coatings were allowed to air-dry to produce luminescent layers. After drying, except where noted, the completed storage panels were overcoated with a polymer solution of cellulose acetate in acetone or with a fluorinated polymer, Kynar 7201 marketed by ELF Atochem North America, Inc., of Bloomington, Minn., or equivalent in acetone.

The relative photostimulated luminescence (PSL) intensities of the image storage panels were measured by cutting 2.6 centimeter diameter disks from the panels, and simultaneously exposing the disks to filtered X-radiation. The X-ray source was a tungsten target tube operating at 70 kVp and 3.0 mA. The filtration consisted of a 3.5 centimeter thickness of aluminum. After exposure to X-rays, the disks were stimulated with a 4-millisecond pulse at 633 nanometers from a 12 mW helium-neon laser. The stimulated emission was detected using a photomultiplier tube after passing through a Schott BG-25 filter. The responses were corrected for X-ray exposure variations by normalizing the measured response in each case to an internal standard. The PSL responses for the Examples are reported relative to the Comparative Example prepared and handled in an identical manner, except no metal hydride stabilizing compound was added to it. The response of the Comparative Example in each case was arbitrarily set equal to 100. The measured PSL responses were corrected for variations in phosphor coverage by dividing by the coverage value determined for that particular disk.

The metal hydride stabilizing compound used to make the panels of Examples 1 to 3 and the PSL intensities for Examples 1 to 3 and the Comparitive Example are listed in Table 1. From Table 1, it is observed that the addition of metal hydride stabilizing compounds to panels containing BaFBr.85I.15:.001Eu$^{2+}$phosphor improves the photostimulated luminescence of the resulting radiographic phosphor panel.

TABLE 1

Effect of Metal Hydride Stabilizing Compounds on the PSL of Radiographic Phosphor Panels

| Example | Metal Hydride Stabilizing Compound | PSL Response |
| --- | --- | --- |
| 1 | Borane-morpholine | 184 |
| 2 | borane-triphenylphosphine | 176 |
| 3 | bis(triphenylphosphine) Copper (I) borohydride | 171 |
| Comparitive Example | none | 100 |

What is claimed is:

1. A radiographic phosphor panel comprising a support, a luminescent layer overlaying said support, and a metal hydride reducing agent for iodine; said luminescent layer including phosphor crystals, and binder, said metal hydride reducing agent for iodine having a concentration sufficient to substantially increase the photostimulated luminescence of said panel.

2. The radiographic phosphor panel of claim 1 wherein said metal hydride reducing agent for iodine has the following structure:

$$D_x[MH_aR_b]y$$

where

D is an inorganic or organic cation;

M is aluminum or boron;

R is an organic or organometallic group;

x and y are chosen such that charge neutrality is obeyed, and y is greater than 0;

a can have a value from 1 to 4; and b can have a value from 0 to 4.

3. The radiographic phosphor panel of claim 2 wherein R is selected from the group consisting of alkyl, aryl, carboxy, alkoxide, amine, amide and phosphine.

4. The radiographic phosphor panel of claim 2 wherein R is selected from the group consisting of methoxide, ethoxide, dimethylamine, trimethylamine, tertbutylamine, pyridine, morpholine, triethylamine, triphenylphosphine, and triethylphosphine.

5. The radiographic phosphor panel of claim 2 wherein M is boron.

6. The radiographic phosphor panel of claim 2 wherein x is greater than 0 and D is selected from the group consisting of Li$^+$, Na$^+$K$^+$, Ca$^{2+}$, Al$^{3+}$, bis(triphenylphosphine) copper and (ethyl)4$^{N+}$.

7. The radiographic phosphor panel of claim 2 wherein said metal hydride reducing agent for iodine comprise the following structure:

$$BH_3R$$

where R is an organic or organometallic group.

8. The radiographic phosphor panel of claim 7 wherein R is selected from the group consisting of alkyl, aryl, carboxy, alkoxide, amine, amide and phosphine.

9. The radiographic phosphor panel of claim 7 wherein R is selected from the group consisting of methoxide, ethoxide, dimethylamine, trimethylamine, tertbutylamine, pyridine, morpholine, triethylamine, triphenylphosphine, and triethylphosphine.

10. The radiographic phosphor panel of claim 1 wherein said phosphor includes a combination of species characterized by the relationship:

$$MFX_{1-z}I_z \cdot uM^aX^a : yA : eQ : tD$$

wherein

M is selected from the group consisting of Mg, Ca, Sr, and Ba;

X is selected from the group consisting of Cl and Br;

M$^a$ is selected from the group consisting of Na, K, Rb, and Cs;

X$^a$ is selected from the group consisting of F, Cl, Br, and I;

A is selected from the group consisting of Eu, Ce, Sm, and Tb;

Q is selected from the group consisting of BeO, MgO, CaO, SrO, BaO, ZnO, Al$_2$O$_3$, La$_2$O$_3$, In$_2$O$_3$, SiO$_2$, TiO$_2$, ZrO$_2$, GeO$_2$, SnO$_2$, Nb$_2$O$_5$, Ta$_2$O$_5$, and ThO$_2$;

D is selected from the group consisting of V, Cr, Mn, Fe, Co, and Ni;

z is from $1 \times 10^{-4}$ to 1;

u is from 0 to 1;

y is from $1 \times 10^{-4}$ to 0.1;

e is from 0 to 1; and t is from 0 to $10^{-2}$.

11. The radiographic phosphor panel of claim 1 wherein said metal hydride reducing agent for iodine is selected from the group consisting of LiAlH$_4$, NaBH$_4$, borane.tertbutylamine, borane.dimethylamine, borane.2,6-lutidine, borane.morpholine, borane.pyridine, borane.triethylamine, borane.trimethylamine, borane.triphenylphosphine, borane.bis(triphenylphosphine) copper and NaBH(OCH$_3$)$_3$.

12. The radiographic phosphor panel of claim 1 wherein said metal hydride reducing agent for iodine is selected from the group consisting of borane.morpholine, borane.trimethylamine and borane.bis(triphenylphosphine) copper.

13. The radiographic phosphor panel of claim 1 wherein said radiographic phosphor panel is a radiation image storage panel.

14. The radiographic phosphor panel of claim 1 wherein said phosphor contains halide.

15. A radiographic phosphor panel comprising a support, a luminescent layer overlaying said support, and an overcoat layer overlaying said luminescent layer, said layers each including binder, said luminescent layer including phosphor crystals and metal hydride stabilizing compound, said metal hydride stabilizing compound being dispersed within said luminescent layer on a substantially molecular basis, said metal hydride stabilizing compound having a concentration sufficient to substantially increase the photostimulated luminescence of said panel.

16. The radiographic phosphor panel of claim 15 wherein said metal hydride stabilizing compound and said binder form a solvent-cast matrix for said phosphor.

17. The radiographic phosphor panel of claim 15 wherein said phosphor is selected from the group consisting of divalent alkaline earth metal fluorohalide phosphors containing iodine and alkali metal halide phosphors containing iodine.

18. The radiographic phosphor panel of claim 15 wherein said phosphor includes a combination of species characterized by the relationship:

$$(Ba_{1-a-b-c}Mg_aCa_bSr_c)FX_{1-z}I_z\cdot rM^aX^a:yA:eQ$$

wherein

X is selected from the group consisting of Cl and Br;

$M^a$ is selected from the group consisting of Na, K, Rb, and Cs;

$X^a$ is selected from the group consisting of F, Cl, Br, and I;

A is selected from the group consisting of Eu, Ce, Sm, and Tb;

Q is selected from the group consisting of BeO, MgO, CaO, SrO, BaO, ZnO, $Al_2O_3$, $La_2O_3$, $In_2O_3$, $SiO_2$, $TiO_2$, $ZrO_2$, $Ge_2O$, $SnO_2$, $Nb_2O_5$, $Ta_2O_5$, and $ThO_2$;

a+b+c is from 0 to 0.4;

z is from $1\times10^{-4}$ to 1;

r is from $1\times10^{-6}$ to 0.1;

y is from $1\times10^{-4}$ to 0.1; and e is from $1\times10^{-5}$ to 0.1.

19. The radiographic phosphor panel of claim 18 wherein said metal hydride reducing agent for iodine has the following structure:

$$D_x[MH_aR_b]y$$

where

D is an inorganic or organic cation;

M is aluminum or boron;

R is an organic or organometallic group;

x and y are chosen such that charge neutrality is obeyed, and y is greater than 0;

a can have a value from 1 to 4; and b can have a value from 0 to 4.

20. The radiographic phosphor panel of claim 19 wherein said metal hydride reducing agent for iodine is selected from the group consisting of borane.morpholine, borane.trimethylamine and borane.bis(triphenylphosphine) copper.

* * * * *